United States Patent [19]
Cress

[11] Patent Number: 6,111,227
[45] Date of Patent: Aug. 29, 2000

[54] FURNACE EXHAUST METHOD AND APPARATUS

[76] Inventor: Steven B. Cress, P.O. Box 30, Glenbrook, Nev. 89413

[21] Appl. No.: 09/326,198

[22] Filed: Jun. 4, 1999

[51] Int. Cl.[7] ..................................................... F27D 11/00
[52] U.S. Cl. ........................... 219/400; 373/110; 432/120
[58] Field of Search ................................... 219/390, 391, 219/400; 432/120; 99/339; 373/109, 110, 118

[56] References Cited

U.S. PATENT DOCUMENTS

| | | | |
|---|---|---|---|
| 5,378,144 | 1/1995 | Cress | 432/120 |
| 5,674,425 | 10/1997 | Hong | 219/681 |
| 5,694,831 | 12/1997 | Haroun et al. | 99/339 |
| 5,756,974 | 5/1998 | Hong | 219/681 |

Primary Examiner—Tu Ba Hoang
Attorney, Agent, or Firm—Herbert C. Schulze

[57] ABSTRACT

An electrically heated furnace wherein electrical heating elements are mounted and supported so that they face the inner furnace walls and are isolated from direct communication with articles being treated within the furnace such that clean air flows over the heating elements providing oxygen to create an aluminum oxide coating on the heating elements and maintains a clean atmosphere about the heating elements. Air circulation from exterior the furnace is through ports in the furnace walls and over the electrical heating elements; exhaust from the furnace is through ports in the furnace walls into a plenum and out through a flue creating pressure differentials with the pressure in the furnace area where articles are being subjected to heat is lower than the atmosphere and the area in which the heating elements are located.

4 Claims, 3 Drawing Sheets

FURNACE EXHAUST METHOD AND APPARATUS

CROSS REFERENCE TO RELATED PATENT APPLICATIONS

The invention is, related to my U.S. Pat. No. 5,378,144 in that it is in the same broad field as that patent.

BACKGROUND OF THE INVENTION

1. Field of the Invention

This invention is in the general field of electrically heated furnaces and the like;

The invention is more particularly directed to methods and apparatus relating to circulation of air and products of combustion in furnaces and the like;

The invention is most particularly in the field of a new and unique method of circulating air and exhausting air and the like from furnaces and the like in a manner which protects electrical heating elements and the like and which enables a greater uniformity and control of heat within the furnace.

2. Description of the Prior Art

There have been various attempts to create systems for improved air circulation and protection of electrical heating elements in electrically heated furnaces and the like. My invention of the system set forth in my above referenced U.S. Pat. No. 5,378,144 was a significant advance in the art.

There continued to be a need for further improvement in the art of circulation of heated air and the exhaust of contaminated heated air from furnaces. In particular, it has been deemed desirable to protect electrical heating elements from physical damage and deterioration due to physical contact with objects and contamination by the products of combustion and the like within furnaces and the like. Until my present invention this has been elusive. Now, however, this is solved with the system disclosed in this application for patent.

The present invention utilizes a new theory, wherein the heating elements are reversed to face the insulation in the furnace or the like and input venting is provided to the area between the heating element plates and the furnace insulation. This results in many advantages as are explained below in the summary and in the description of a preferred embodiment.

SUMMARY OF THE INVENTION

In the furnace arts, and particularly high temperature furnaces such as electrically heated ceramic kilns and the like, a continuing problem is physical damage to, and deterioration of, the electrical heating elements by reason of the elements operating in an atmosphere contaminated with products of combustion and gasses released by products being treated in such furnaces and by physical damage through contact with various objects such as in loading and unloading articles from the furnace and from collapse of kiln furniture.

Until my present invention various air circulation devices have been tried. For example, my afore mentioned U.S. Pat. No. 5,378,144 was concerned with this problem, but did not completely solve it.

I have now conceived and developed a new, unique, and effective answer to this old problem. I have accomplished this by reversing my thinking, and the thinking of others in this art, as to the disposition of the electrical heating elements. In the past it been customary to think in terms of achieving the most direct exposure of articles within a furnace to the direct radiant heat of the electrical elements. I have now found that I am able to achieve superior, heating and treatment of articles in a more economical and timely manner by reversing the electrical heating elements so that they face the walls of the furnace and the furnace becomes essentially a convection furnace. By proper arrangement of venting and exhaust control I achieve extraordinary results, including, among others: 1) improved heat distribution; 2) clean heating elements ; 3) protection of heating elements by coating with aluminum oxide; 4) physically protecting heating elements from damage; 5) reducing air contamination outside the furnace due to reduced furnace interior pressure preventing contamination from leaking about the furnace door; 6) reduced heating cycle time; 7) increased heating element life; 8) uniformity of temperature and temperature control within the furnace treating interior; 9) cooling the furnace walls and preheating air by fresh air intake directly over the heating elements.

It is an object of this invention to improve heated air circulation within furnaces and the like;

Another object is to increase the useful life of heating elements;

Another object of this invention is improve the quality of air adjacent the exterior of furnaces and the like;

Another object of this invention is to protect heating elements in a furnace from physical damage;

Another object of this invention is to provide cooling air flow over the heating elements while at the same time, and by reason of, providing for automatic production of a protective aluminum oxide coating on the heating elements, thus reducing heating element deterioration and enhancing heating element useful life;

Another object of this invention is to cool the furnace interior walls by introduction of fresh air, at the same time preheating the fresh air;

Another object of this invention is to reduce furnace treatment time cycles;

Another object of this invention is to enable superior uniformity of temperature and temperature control within furnaces.

Another object of this invention is to improve the quality of heat treatment within a furnace.

The foregoing and other objects and advantages of this invention will be apparent to those skilled in the art upon reading the description of a preferred embodiment, which follows, in conjunction with a review of the appended drawings.

DESCRIPTION OF A PREFERRED EMBODIMENT

Figure 1:
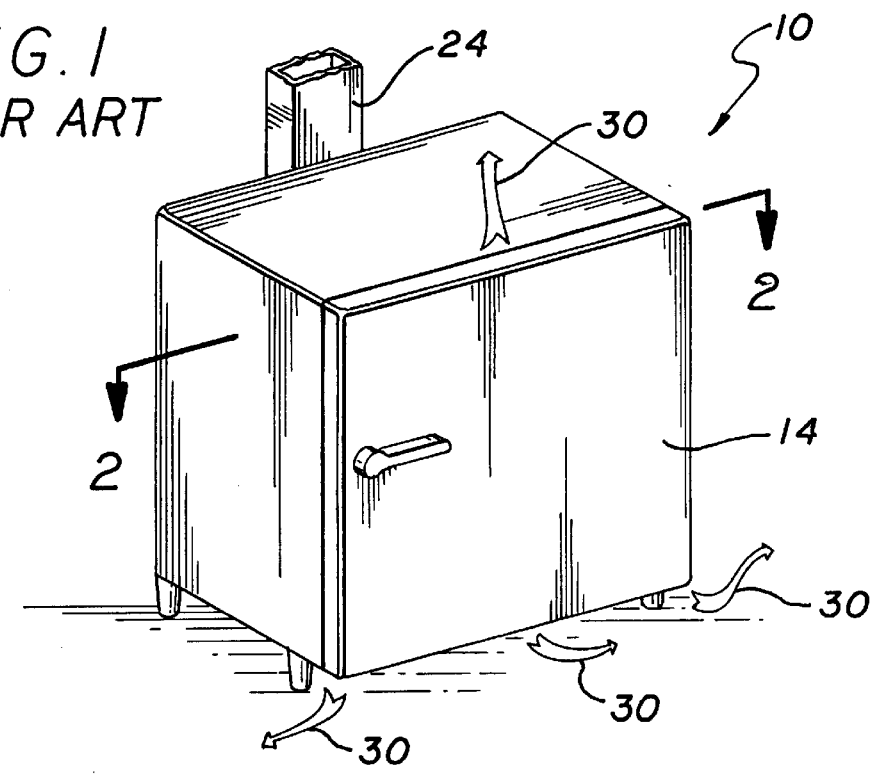
FIG. 1 is a schematic perspective of a furnace of the prior art.

An inventory of items bearing reference numerals on the accompanying drawings:

| Item | Description |
| --- | --- |
| 10 | prior art furnace |
| 12 | firebrick |
| 14 | door |
| 15 | hinge |
| 16 | heating elements |
| 17 | heating element backing/support |
| 18 | articles being treated in oven |
| 20 | exhaust duct |
| 24 | exhaust |
| 30 | contaminated air |
| 40 | contaminated air |
| 100 | furnace |
| 114 | door |
| 115 | hinge |
| 116 | heating elements |
| 117 | heating element backing/support |
| 120 | seal |
| 121 | exhaust ports |
| 122 | plenum |
| 123 | check valves |
| 124 | exhaust stack |
| 125 | air intake port |
| 126 | check valve |
| 127 | fan |
| 128 | fan |
| 130 | cold air intake path |
| 135 | heated air path |
| 140 | contaminated air path |
| 201 | atmosphere outside furnace |
| 202 | zone between furnace wall and heating elements |
| 203 | furnace area in which articles are treated |
| 204 | plnum |
| 205 | kaowool |

Figure 2:
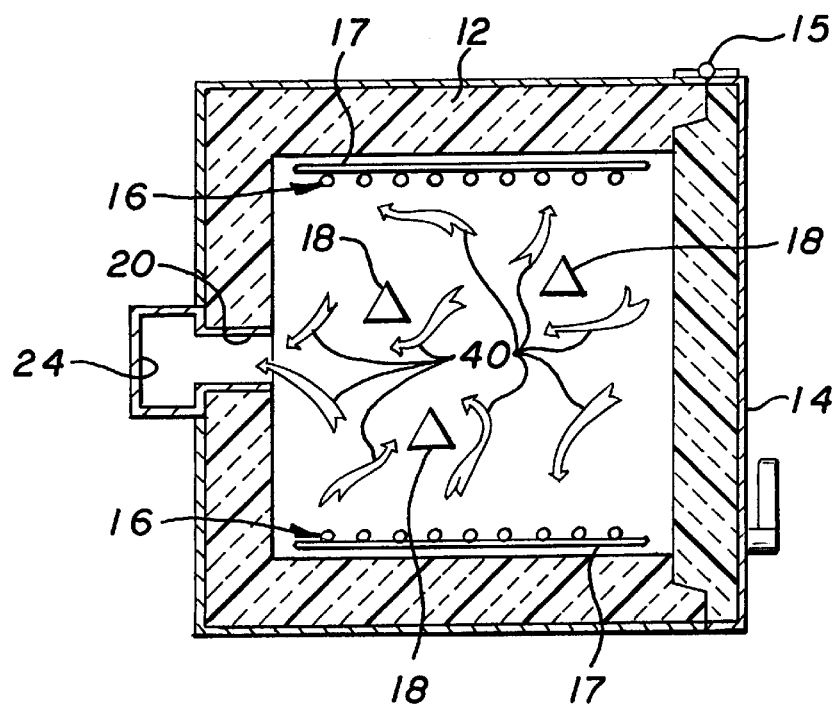
FIG. 2 is a schematic section on 2—2 on FIG. 1.

FIGS. 1 and 2 show schematically a high temperature furnace and the air flow through the furnace according to the art prior to my present invention. A furnace 10, shown here as a cube, is formed with insulated walls 12, an insulated door 14, and an exhaust stack 24 for exhaust gasses. In operation there will be articles 18 within the furnace, which articles are subjected to heating in the furnace. Electrical heating elements 16 will be mounted on a backing and support member 17. The electrical heating elements 16 face the articles being subjected to heat. Contaminated heated air 40 containing various corrosive impurities will circulate throughout the furnace and in contact with all surfaces including the electrical heating elements as is known to those skilled in the art. The contaminated air coats the heating elements with impurities and causes corrosion and ultimate failure of the heating elements.

In some cases the heating elements may be somewhat enclosed and partially protected by insulation such as cement or the like. This is not thoroughly effective. While there may be a measure of passive protection by doing this it is never complete protection since the insulation will crack and allow the contaminated air to work its destruction of the elements.

The heated air may be exhausted through duct 20 and chimney 24.

Figure 3:
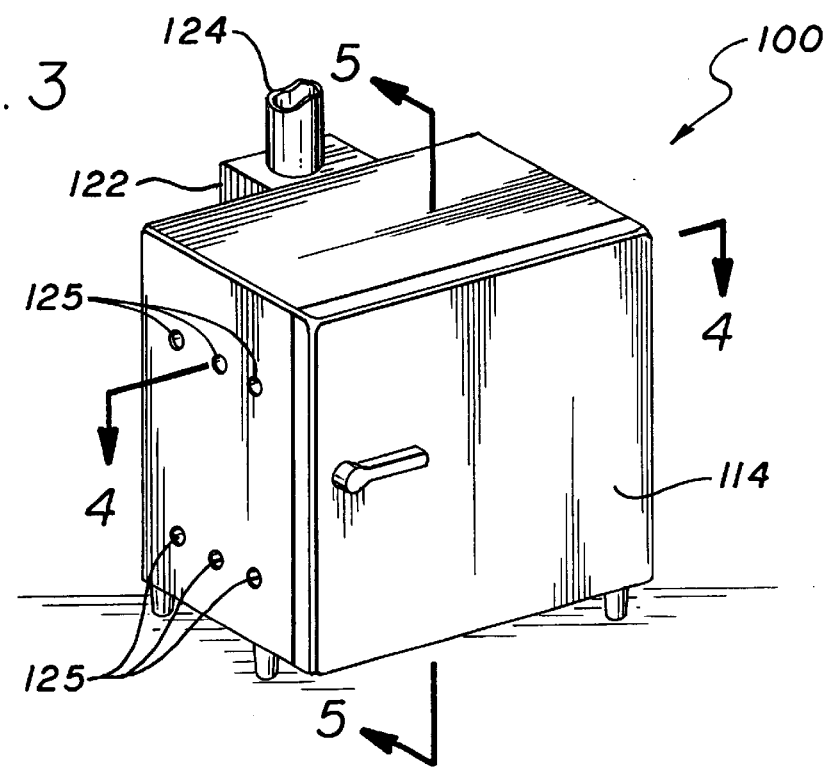
FIG. 3 is a schematic perspective of an apparatus suitable to practice the method of this invention.
Figure 4:
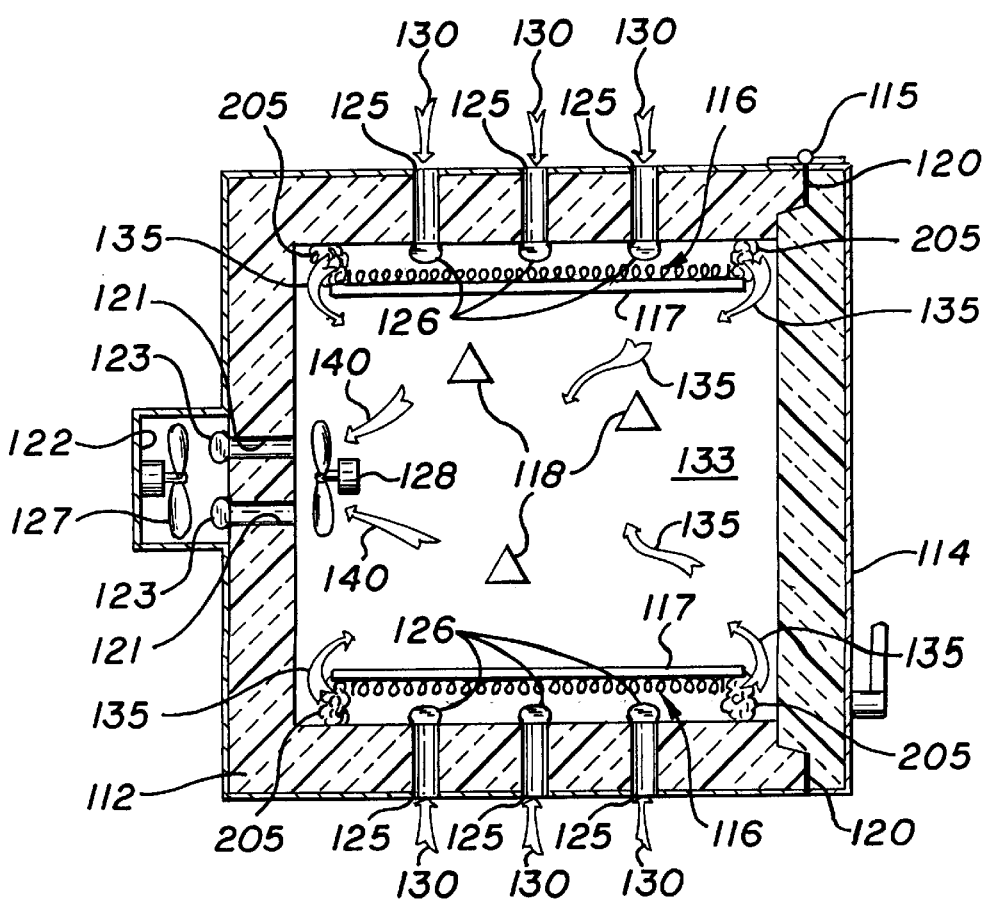
FIG. 4 is a schematic section on 4—4 on FIG. 3.
Figure 5:
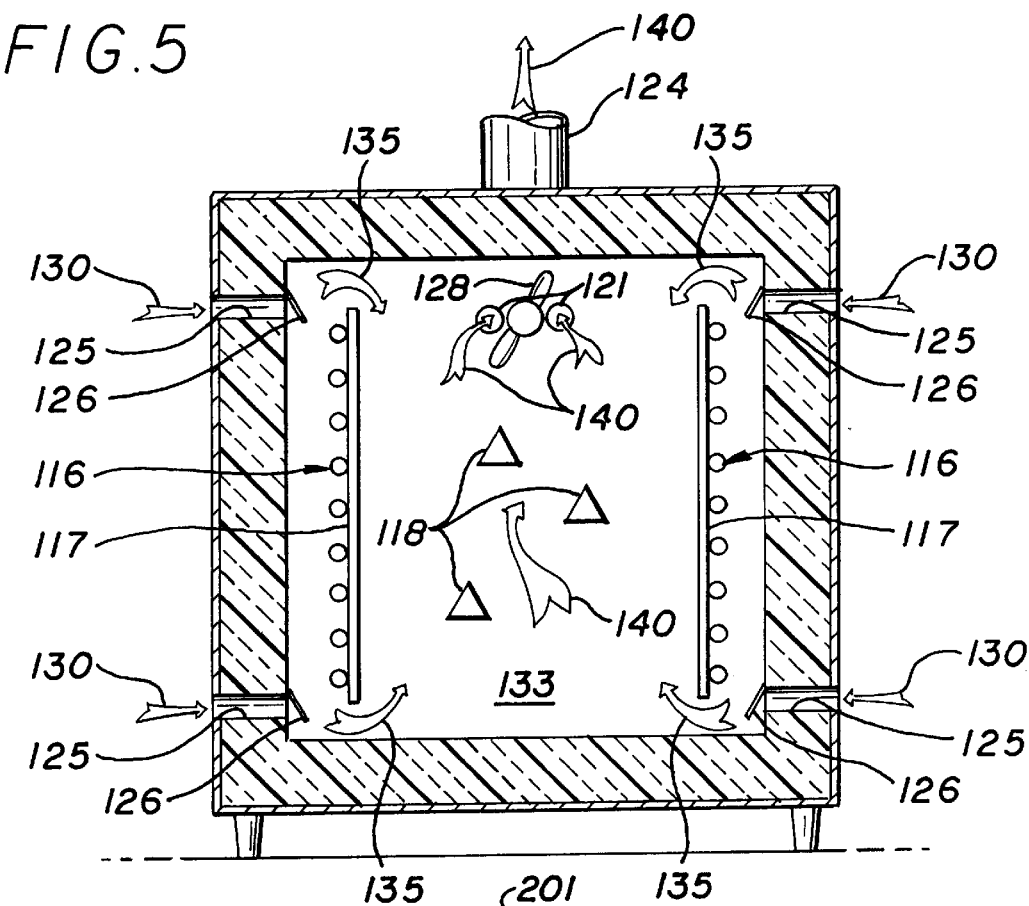
FIG. 5 is a schematic section on 5—5 on FIG. 3.

FIGS. 3, 4, and 5 illustrate, schematically, my new invention. FIG. 3 appears to be a customary furnace 100 with door 114 and exhaust stack 124. A feature which is unusual in FIG. 3 shows a plenum chamber 122. From its outer appearance my new furnace may not seem unusual, but the unusual nature in operation will be understood by those skilled in the art upon reading this complete specification.

Upon examining FIGS. 4 and 5 the unusual nature of furnace 100 will become immediately apparent to those skilled in the art. It is observed that the furnace 100 has walls of firebrick or the like 112, an insulated door 114, electrical heating elements 116, and heating element support and backing member 117. Work pieces 118 such as ceramic goods or the like are being treated within the furnace. It is important to note that the electrical heating elements do not face the work pieces 118, but they face the walls 112 of the furnace. There is a small space between the walls and the heating elements sufficient to allow adequate air flow.

One feature of this method and apparatus is that the loading of the work pieces is now safe. Before my present invention, when loading work pieces, especially where a very full load is to be inserted in a furnace, damage can be done to the heating elements by inadvertent scraping or bumping of a work piece against the elements. Additionally, loads in the furnace are usually supported on kiln fixtures which can, and do, collapse from time to time. When this occurs severe damage can be done to the heating elements. As is clear from an examination of the drawings and from the general knowledge of those skilled in the art the collapse of a load in my new furnace will not affect the heating elements, nor will scraping or other contact when inserting and removing loads.

A number of ports 125 are provided through the walls of the furnace. Ports 125 allow cool air 130 to enter the furnace. Each port may be equipped with a check valve such as a bellows type flap covering 126 or the like on the inside of the ports 125. These check valves prevent air from exiting the ports 125 but allow air from outside to enter as will be known by those skilled in the art. The air being introduced into the furnace in this manner cools the furnace walls and at the same time becomes preheated. The preheated clean air then flows over and about the heating elements. This aids in the protection of the heating elements by keeping them clean, while at the same time forming an aluminum oxide coating on the heating elements as discussed below.

Exhaust ports 121 with or without check valves 123 allow the exhaust of heated and contaminated air from the interior of the furnace. If check valves 123 are used they allow exhaust air to enter plenum chamber 122 from which it passes through flue 124 to the atmosphere or to a treating chamber for removal of contaminates as is known to those skilled in the art. The check valves 123 will prevent exhaust air from reentering the furnace.

Fan(s) 127 and/or 128 may be used to enhance the air flow out of the furnace as will be understood by those skilled in the art.

The heating elements are primarily composed of iron, with a very small percentage of aluminum. In the operation of my new system, oxygen from the clean air circulating over the elements—isolated from the contaminated air in the furnace—will gradually cause oxidation, thus coating the elements with aluminum oxide, which further protects the elements, as will be understood by those skilled in the art.

As will be understood by those skilled in the art, atmospheric air 130 will enter the furnace through ports 125 and, if used, check valves 126. This air will be heated by the heating elements 116 and will enter the furnace treating area 133 as heated air 135. At this time the air 135 will begin to contact the work pieces 118 and become contaminated air 140, which is finally exhausted through ports 121 into plenum chamber 122 and then to exhaust flue 124 for release to the atmosphere or treatment as previously mentioned.

Figure 6:
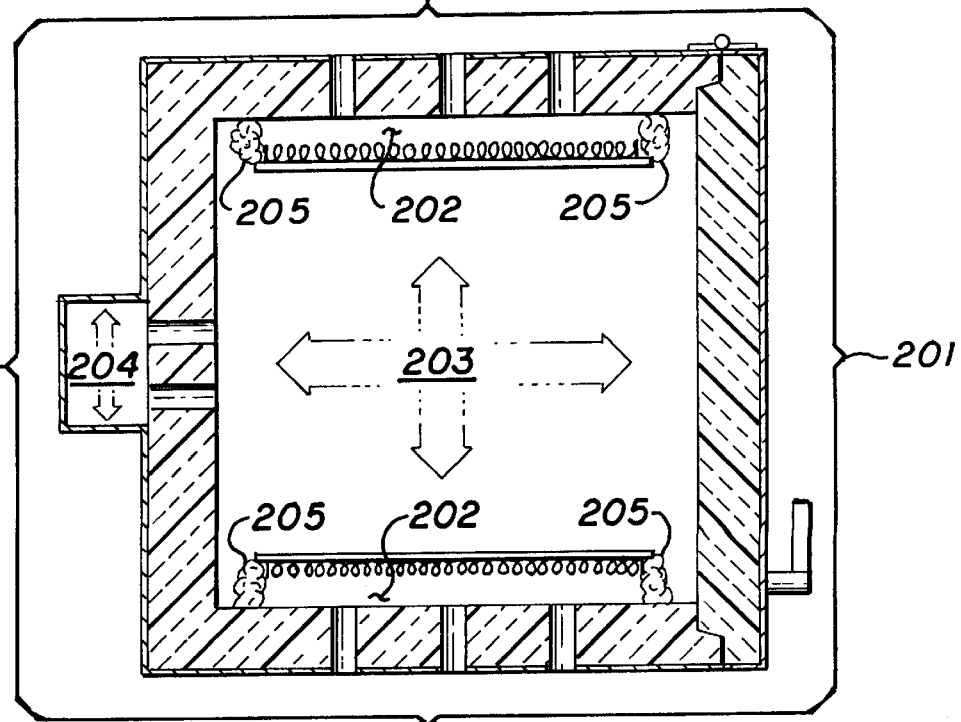
FIG. 6 is a schematic diagram illustrating pressure zones in and around a furnace of this invention.

In my new system, there will be essentially four different pressure zones as shown schematically in FIG. 6. The first pressure zone is the atmosphere 201 outside the furnace. The next pressure zone, which is the zone 202 between the heating elements and the wall of the furnace, will be slightly lower pressure than the atmosphere zone 201. The portion of the furnace, zone 203, in which articles are treated, will be at a lower pressure than zone 202, thus keeping the contaminated air from entering zone 202. Zone 204, within the plenum, will be the highest pressure, as will be understood by those skilled in the art. This higher pressure will be the greatest when it is created by the action of the fan(s) 127 and/or 128 (not shown in FIG. 6, but understood by those skilled in the art and by reference to FIG. 4).

As an added optional feature to further protect the heating elements in FIG. 6 from contamination and deterioration by reason of contact with contaminated air, I have shown loosely packed kaowool or like 205 between the ends of each bank of heating elements and the adjacent furnace wall. The kaowool will allow the passage of clean air, but will entrap the heavy molecules of impurities in the unlikely event that there should be some backflow of contaminated air from zone 203 to zones 202

During this whole process no contaminated air has been able to come in contact with the heating elements, leaving them clean and not corroded. At the same time, the protective coating of aluminum oxide is being formed on the elements as previously described.

In customary furnaces before this invention, the heating of articles being treated in the furnace has not been totally uniform. The direct radiant heat from the electrical heating elements is not uniform, as is known to those skilled in the art. Operating in accordance with this new invention, the air is heated at a distance from the articles being treated. As this heated air flows into the area in which articles are treated, the articles receive uniform heat since the air has achieved a stabilized heat condition not affected in the portion of the furnace in which articles are treated by the irregular influence of the radiant heat.

While the embodiments of this invention shown and described are fully capable of achieving the objects and advantages desired, it is to be understood that such embodiments have been presented for purposes of illustration only and not for purposes of limitation.

What is claimed is:

1. A method for vitrifying ceramic articles comprising:

providing a heat insulated enclosure including a top, a bottom, and walls;

inserting articles being subjected to heat in said enclosure;

inserting electrical heating elements support means adjacent the walls of the enclosure;

fastening electrical heating elements composed of material including iron and aluminum to the support means intermediate the walls and the support means;

providing first vent means through said walls adjacent said electrical heating elements for intake of air;

causing air to travel through said first vent means over the electrical heating elements and over the articles being subjected to heat;

providing second vent means not adjacent the electrical heating elements for the escape of air from the enclosure;

and, causing air which has traveled over the electrical heating elements and the ceramic articles to exit the furnace through said second vent means.

2. The method of claim 1 wherein aluminum oxide coating is caused to be deposited on the electrical heating elements by reason of oxygen in the clean air traveling over the electrical heating elements combining with aluminum in the heating elements.

3. A method for subjecting articles to heat comprising:

constructing a heat insulated enclosure including a top, a bottom, and walls;

inserting articles to be subjected to heat into said enclosure;

providing electrical heating elements support means adjacent the walls, and within, the enclosure;

installing electrical heating elements upon the support means intermediate the walls and the support means;

providing first vent means through said walls adjacent said electrical heating elements for intake of air;

activating said electrical heating elements so as to produce heat, thus subjecting the article to heat;

causing air to travel through said first vent means over the electrical heating elements and over the articles being subjected to heat;

providing second vent means not adjacent the electrical heating elements for the escape of air from the enclosure; and blowing air which has traveled over the electrical heating elements and the articles being subjected to heat through said second vent means into a plenum in such manner that the air in the plenum is at a higher pressure than both the air pressure in the furnace and the atmosphere pressure outside the plenum.

4. The method of claim 3 wherein a lower pressure is created in the area of the furnace where articles are being subjected to heat than the pressure at the heating elements.

* * * * *